United States Patent
Fan et al.

(10) Patent No.: US 8,326,677 B1
(45) Date of Patent: Dec. 4, 2012

(54) SYSTEM AND METHOD FOR SELECTING AN OPTIMAL FORECASTING HIERARCHY

(76) Inventors: Jianqing Fan, Princeton, NJ (US); Yikang Li, Spring, TX (US)

(*) Notice: Subject to any disclaimer, the term of this patent is extended or adjusted under 35 U.S.C. 154(b) by 64 days.

(21) Appl. No.: 12/963,799

(22) Filed: Dec. 9, 2010

(51) Int. Cl.
*G06Q 10/00* (2006.01)

(52) U.S. Cl. .......... 705/7.37; 705/7.31; 705/7.36; 706/19; 706/21; 706/47; 706/925

(58) Field of Classification Search .......... 706/15, 706/16, 19, 21, 45, 52, 55, 925; 705/7.36, 705/7.37, 7.31, 14.52
See application file for complete search history.

(56) References Cited

U.S. PATENT DOCUMENTS

| | | | |
|---|---|---|---|
| 6,611,726 B1 * | 8/2003 | Crosswhite | 700/99 |
| 7,028,000 B1 | 4/2006 | Li | |
| 7,197,473 B2 | 3/2007 | Li | |
| 7,251,614 B1 | 7/2007 | Li | |
| 7,783,533 B1 | 8/2010 | Fan et al. | |
| 2003/0182250 A1 * | 9/2003 | Shihidehpour et al. | 706/21 |
| 2009/0113049 A1 * | 4/2009 | Nasle et al. | 709/224 |
| 2012/0035984 A1 * | 2/2012 | Gorur Narayana Srinivasa et al. | 705/7.35 |
| 2012/0053989 A1 * | 3/2012 | Richard | 705/7.31 |

OTHER PUBLICATIONS

Grunfeld et al., "Is Aggregation Necessarily Bad?," The Review of Economics and Statistics, Feb. 1960, pp. 1-13, vol. 42, No. 1, MIT Press.
Fliedner, Gene, "An Investigation of Aggregate Variable Time Series Forecast Strategies With Specific Subaggregate Time Series Statistical Correlation," Computers and Operations Research, 1999, pp. 1133-1149, vol. 26, Pergamon.
Hyndman et al., "Optimal Combination Forecasts for Hierarchical Time Series," Department of Economics and Business Statistics, Jul. 17, 2007, pp. 1-22, Monash University.
Kahn, Kenneth B., "Revisiting Top-Down Versus Bottom-Up Forecasting," The Journal of Business Forecasting, Summer 1998, pp. 14-19.
Orcutt et al., "Data Aggregation and Information Loss," American Economic Review, 2001, pp. 773-787, American Economic Association.
Schwarzkopf et al., "Top-down versus Bottom-up Forecasting Strategies," Int. J. Prod, 1988, pp. 1833-1843, vol. 26, No. 11.
Shlifer et al., "Aggregation and Proration in Forecasting," Management Science, Jun. 1979, pp. 594-603, vol. 25, No. 6, The Institute of Management Sciences.
Tiao et al., "Forecasting Contemporal Aggregates of Multiple Time Series," Journal of Econometrics, 1980, pp. 219-230, vol. 12, North-Holland Publishing Company.

* cited by examiner

*Primary Examiner* — Ramsey Refai
*Assistant Examiner* — Deirdre Hatcher
(74) *Attorney, Agent, or Firm* — James E. Walton; J. Oliver Williams

(57) ABSTRACT

A system for determining an optimal forecasting hierarchy includes setting a plurality of hierarchies by setting each hierarchy in terms of a hierarchy structure. The system also includes generating top level forecasts for a training period and a testing period, each top level forecast being based upon an aggregation of the base forecast levels. The system further includes calculating a forecast error. An optimization routine includes determining an optimal hierarchy and an optimal base level, both being based upon a smallest associated forecast error. The optimization routine also includes calculating a deficiency ratio for each level within each hierarchy by comparing forecast errors associated with the optimal base level and the optimal hierarchy to forecast errors associated with each of the other base levels and hierarchies. The optimal forecasting hierarchy is determined by comparing the deficiency ratio to a significance level.

27 Claims, 5 Drawing Sheets

US 8,326,677 B1

SYSTEM AND METHOD FOR SELECTING AN OPTIMAL FORECASTING HIERARCHY

BACKGROUND

1. Field of the Invention

The system and method of the present application relate generally to business forecasting and analysis, and more particularly to determining an optimal forecasting hierarchy.

2. Description of Related Art

In business and economics, there are often applications requiring forecasts of many related time series organized in hierarchical structures based on attributes of classifications. Existing approaches to hierarchical forecasting start with a given hierarchy then follow by evaluating the performance of reconciling forecasting methods. Literature on reconciling forecasting methods can be classified into three groups: (1) "top-down", (2) "bottom-up", (3) a combination of "top-down" and "bottom-up." These conventional forecasting methods imply a key assumption that the hierarchical structure had already been optimally determined. However, the legitimacy of this assumption is questionable. In practice, many selected hierarchical structures are determined in an Ad Hoc manner. Further, for a hierarchical system with median dimension of classification, it will be difficult to conduct exhaustive Ad Hoc analysis to determine an optimal hierarch. Therefore, an analytical approach to find an optimal forecasting hierarch is appealing.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
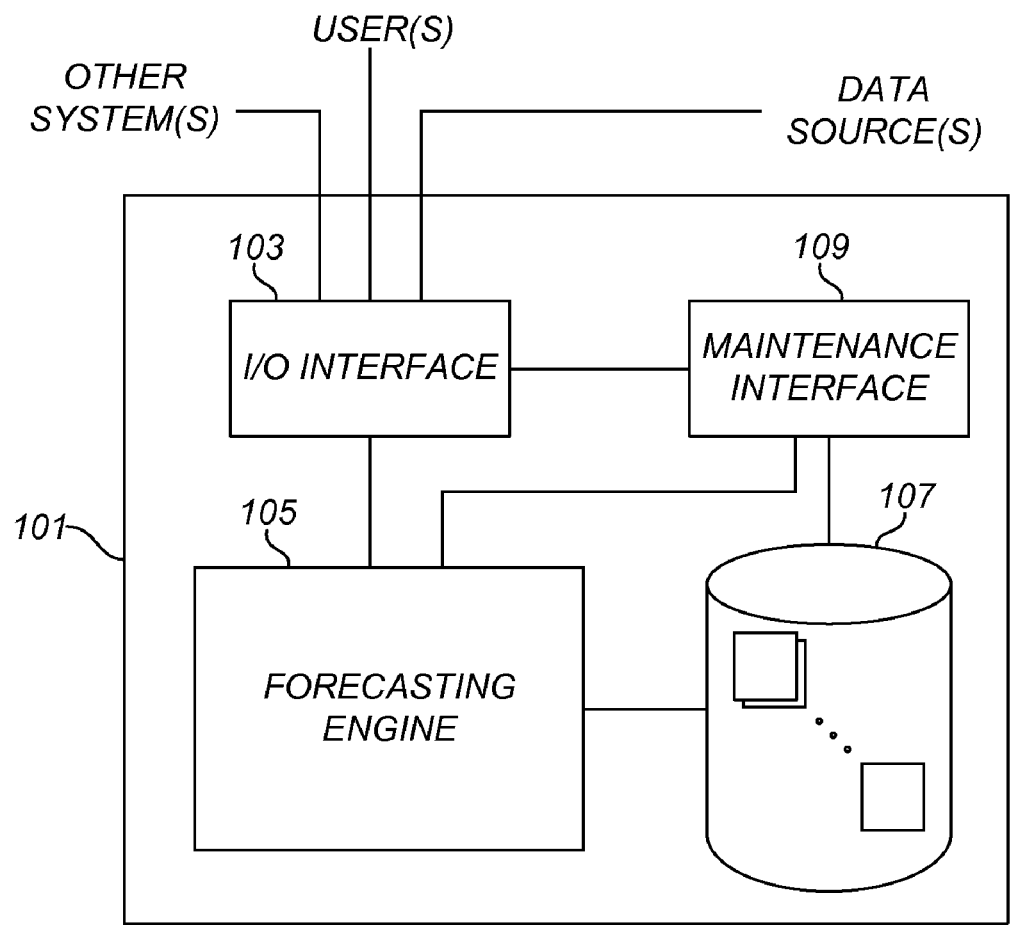
FIG. 1 is a schematic block diagram of an embodiment of a forecasting system.

FIG. 1 illustrates an exemplary forecasting system 101 for evaluating and selecting an optimal forecasting hierarchy. The optimal forecasting hierarchy may be relative to a wide variety of business applications. For example, an optimal forecasting hierarchy in the mortgage industry may involve a hierarchical structure with a combination of structure levels related to mortgage loans, regions, loan types, and loan terms.

The forecasting system 101 includes an input/output (I/O) interface 103, an forecasting engine 105, a database 107, and a maintenance interface 109. Alternative embodiments can combine or distribute the input/output (I/O) interface 103, forecasting engine 105, database 107, and maintenance interface 109, as desired. Embodiments of the forecasting system 101 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 103 provides a communication link between external users, systems, and data sources and components of the forecasting system 101. The I/O interface 103 can be configured for allowing one or more users to input information to the forecasting system 101 via any known input device. Examples can include a keyboard, mouse, touch screen, microphone, and/or any other desired input device. The I/O interface 103 can be configured for allowing one or more users to receive information output from the forecasting system 101 via any known output device. Examples can include a display monitor, a printer, a speaker, and/or any other desired output device. The I/O interface 103 can be configured for allowing other systems to communicate with the forecasting system 101. For example, the I/O interface 103 can allow one or more remote computer(s) to access information, input information, and/or remotely instruct the forecasting system 101 to perform one or more of the tasks described herein. The I/O interface 103 can be configured for allowing communication with one or more remote data sources. For example, the I/O interface 103 can allow one or more remote data source(s) to access information, input information, and/or remotely instruct the forecasting system 101 to perform one or more of the tasks described herein.

The database 107 provides persistent data storage for forecasting system 101. While the term "database" is primarily used, a memory or other suitable data storage arrangement may provide the functionality of the database 107. In alternative embodiments, the database 107 can be integral to or separate from the forecasting system 101 and can operate on one or more computers. The database 107 preferably provides non-volatile data storage for any information suitable to support the operation of the forecasting system 101, including various types of data discussed herein.

The maintenance interface 109 is configured to allow users to maintain desired operation of the forecasting system 101. In some embodiments, the maintenance interface 109 can be configured to allow for reviewing and/or revising the data stored in the database 107 and/or performing any suitable administrative tasks commonly associated with database management. This can include, for example, updating database management software, revising security settings, and/or performing data backup operations. In some embodiments, the maintenance interface 109 can be configured to allow for maintenance of the forecasting engine 105 and/or the I/O interface 103. This can include, for example, software updates and/or administrative tasks such as security management and/or adjustment of certain tolerance settings.

The forecasting engine 105 is configured for selecting one or more optimal forecasting hierarchies, according to embodiments disclosed herein. The forecasting engine 105 can include various combinations of one or more processors, memories, and software components. Forecasting engine 105 is configured to perform a process for selecting an optimal forecast hierarchy, as described herein with regard to FIGS. 2-5.

Figure 2:
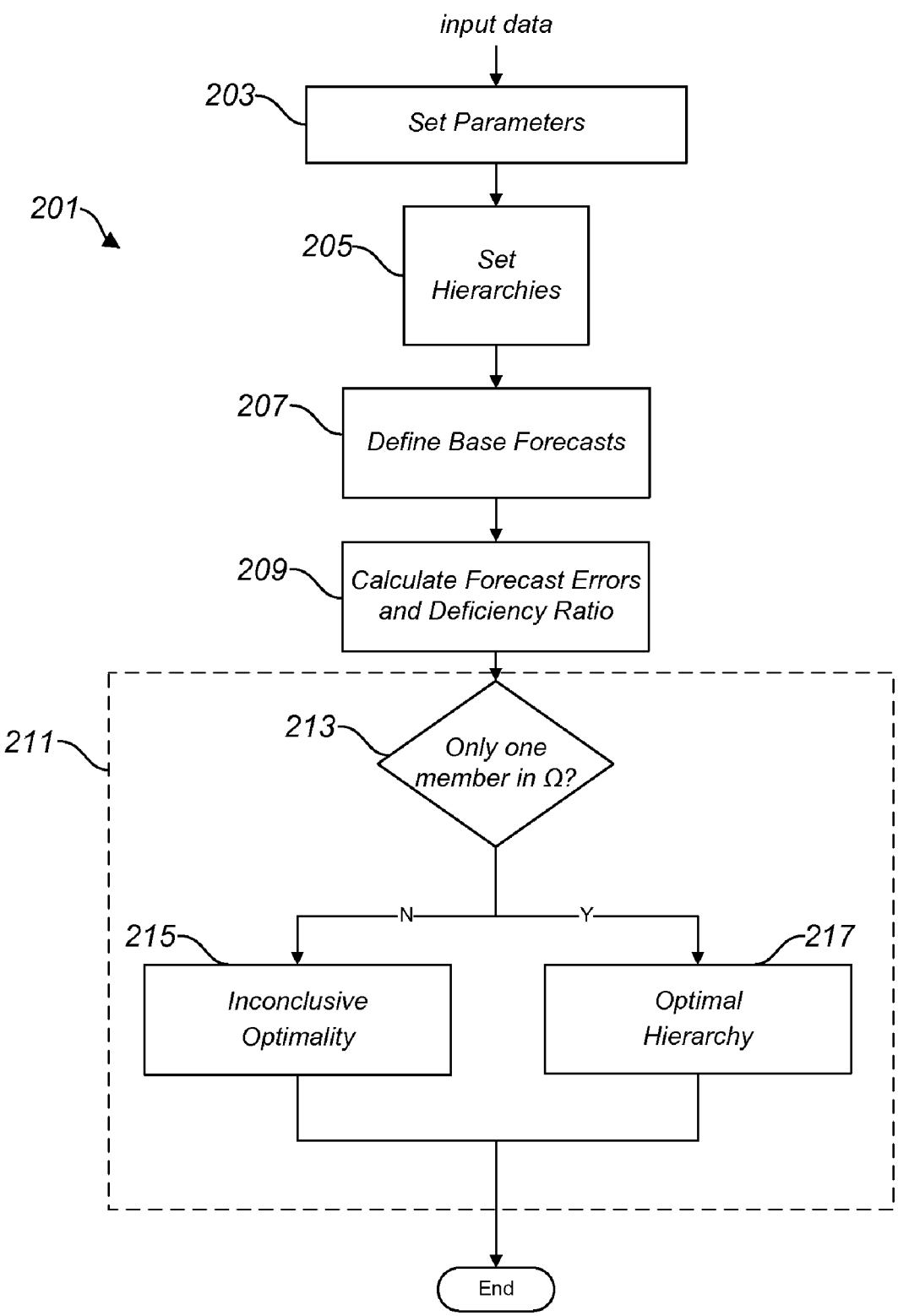
FIG. 2 is a flowchart of a method of determining an optimal forecast hierarchy, according to the preferred embodiment of the present application.

Referring to FIG. 2, a method 201 of determining an optimal forecasting hierarchy is illustrated. Method 201 first includes inputting data regarding the business case for which an optimal forecasting hierarchy is being determined. A step 203 includes setting parameters in order to dictate the parameters for which the optimal forecasting hierarchy is being determined. For example, one parameter may include a time duration for which the hierarchy is evaluated.

A step 205 includes setting hierarchies in terms of the hierarchy structure itself. In many business cases, there exist multiple relevant hierarchies. For example, a mortgage data system can have, but not limited to the following hierarchical structures, starting from the highest level:

Hierarchical structure I:
All mortgage loans
  Regions
    Loan types
      ➤ Loan term
Hierarchical structure II
All mortgage loans
  Loan types
    Regions
      ➤ Loan term
Hierarchical structure III
All mortgage loans
  Loan terms
    Regions
      ➤ Loan types Since different hierarchies have different sets of time series, different hierarchies will yield different aggregated forecasts. Therefore, optimal determination of a hierarchical structure is an important step for hierarchical forecast processes.

Notations for Hierarchical Time Series

Further regarding step 205, a multi-level hierarchical system can be generally presented in many different ways. A hierarchy is detailed by the structure specified. Step 205 includes denoting level 0 as the completely aggregated series, level 1 as first level of disaggregation, and down to level L as the most disaggregated time series. Note that the order of classification determines the structure of the hierarchy.

Figure 3:
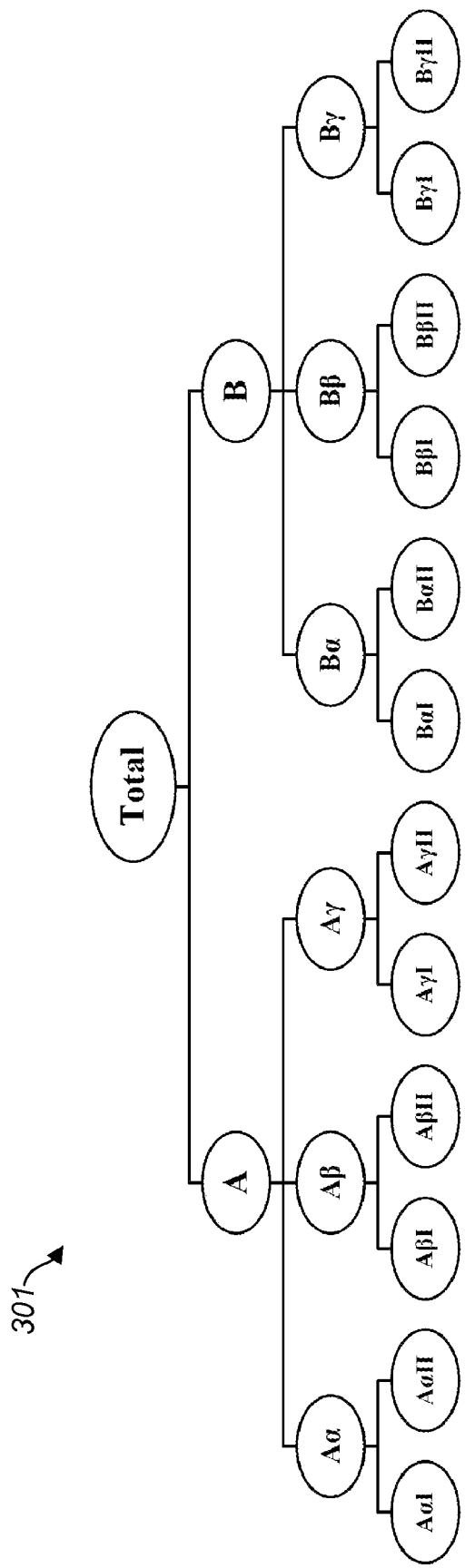
FIG. 3 is a schematic of a first exemplary three level hierarchical tree diagram.
Figure 4:
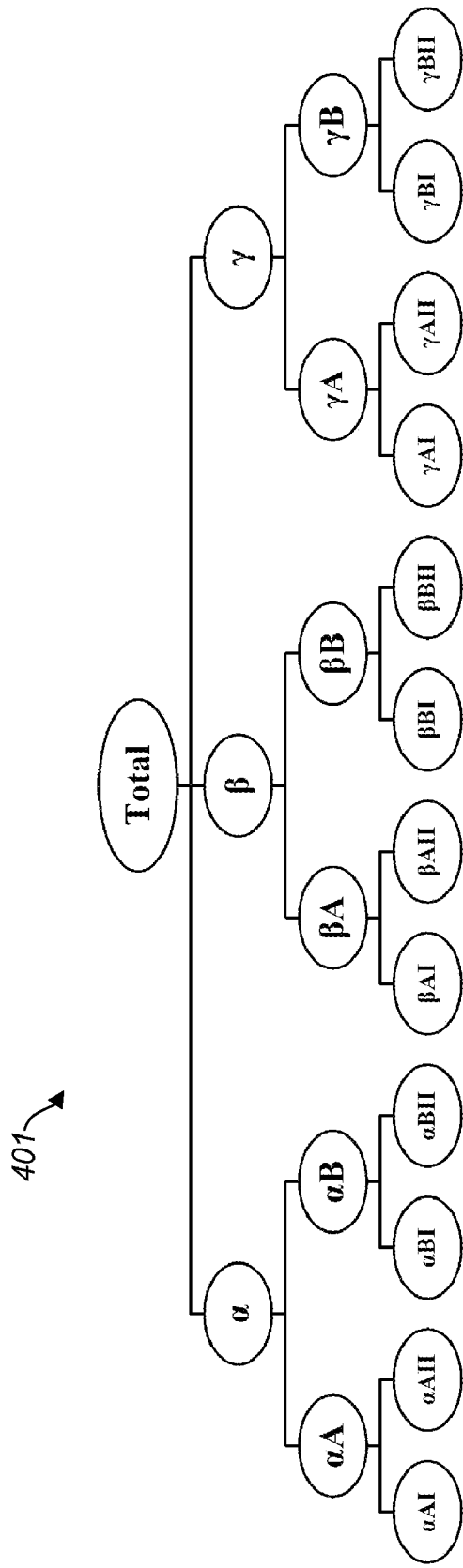
FIG. 4 is a schematic of a second exemplary three level hierarchical tree diagram.
Figure 5:
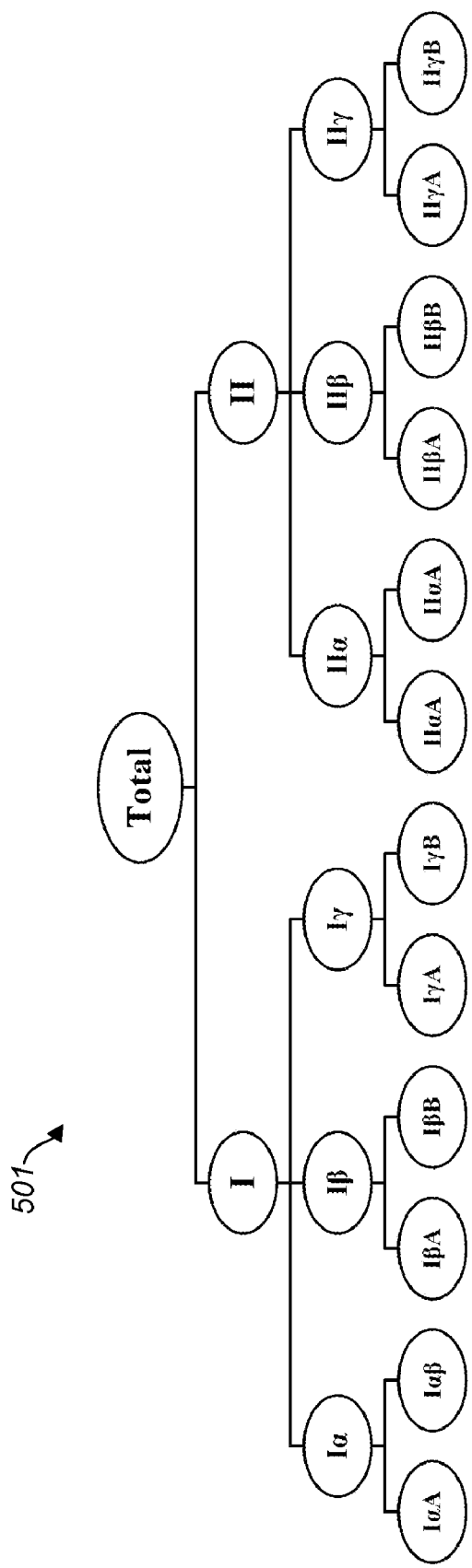
FIG. 5 is a schematic of a third exemplary three level hierarchical tree diagram.

For example, suppose we had three groups of classification: indexed in English letter and Greek letter and Roman number. Thus, there are 6 possible hierarchical structures: {E,G,R}, {E,R,G}, {G,E,R}, {G,R,E}, {R,E,G}, {R,G,E}. For clarity, only show three hierarchical tree structures are illustrated. FIG. 3 illustrates a first three level hierarchical tree diagram 301, having the order of English/Greek/Roman. FIG. 4 illustrates a second three level hierarchical tree diagram 401, having the order of Greek/English/Roman. FIG. 5 illustrates a third three level hierarchical tree diagram 501, having the order of Roman/Greek/English.

In general, a hierarchical data system with L dimension of classifications can have $$\binom{L}{1} \cdot \binom{L-1}{1} \cdots \binom{1}{1} = L!$$

hierarchical tree structures. Each structure is the special representation of the data system. Hierarchical tree diagrams 301, 401, and 501, are denoted as H1, H2, and H3, respectively. Each node in the diagrams 301, 401, and 501 is a component (or a branch) in the given hierarchy. Three notations are used to identify components and sets of components in a given hierarchy.

The first notation includes the notation X to represent a general component and an ordered combination of English/Greek/Roman letters to represent the specified component. Thus, X=A means the first component at level 1 in H1; X=βA is the first branch stemmed from the branch β in H2, namely, the third component at level 2 in H2; and X=Πγβ represents the second component stemmed from the branch Πγ, i.e., the 12th component at level 3 in H3. Further, the notation $Y_{X,t}$ is used to represent an observation on component X at time t. Note that this notation is designed for identifying a single component in a hierarchy. To identify sets of components in a given hierarchy, we introduce the other two notations.

The second notation includes specifying group-wise components (all components in the same group have same group identity). Y is used to represent a general component, with stacked subscriptions (i,ij,ijk, . . . ) used to represent the location of the component(s). For example, $Y_i$ is the $i^{th}$ component at level 1. Further, $Y_{ij}$ is the $j^{th}$ component of the group at level 2 and all the components in that group are stemmed from $Y_i$. Thus, $Y^{1H_1}$ represents the first component at level 1 in H1, or X=A; and $Y_{21}^{H_2}$ represent the first component of the group stemmed from the second component at level 1 in H2, or X=βA; and $Y_{232}^{H_3}$ represents the second component of the group stemmed from X=Πγ in H3. Now, $m_+^{H_1}$, $m_{i+}^{H_1}$ and $m_{ij+}^{H_1}$ represents the total number of components at level 1, and the total number of components stemmed from the $i^{th}$ component at level 1, and the total number of components stemmed from $ij^{th}$ component at level 2 in H1, respectively. Thus, i=1, . . . , $m_+^{H_1}$, and j=1, . . . , $m_{i+}^{H_1}$, ∀i, and k=1, . . . , $m_{ij+}^{H_1}$, ∀ij. More specifically, in Hierarchy H1, $m_+^{H_1}$=2, and $m_{1+}^{H_1}$=3, and $m_{12+}^{H_1}$=2.

The third notation includes using conventional matrix subscripts, $X_{i,j}$. Here, i stands for level of the hierarchy and j is an index of a component within that level. Further, $m_1^{H_1}$ and $m_2^{H_1}$ and $m_3^{H_1}$ are represented to be the total number of level 1, level 2 and level 3 in H1, respectively. More specifically, $m_1^{H_1}$=2, $m_2^{H_1}$=6 and $m_3^{H_1}$=12. Note that this third notation specifies level-wise components (all components in the same level have same level identity) and that $m_1^{H_1}$=$m_+^{H_1}$ in the notation.

Note that the first, second, and third notations described above only identify the location of a component in a hierarchy. Further, each notation does not indicate how a particular component is presented. Actually, any components (excluding those in lowest level) can be presented in many different ways. For example, the top component can be presented by summations of components at many different lower levels. Therefore, it is necessary to further specify the presentation of hierarchical time series.

Group-Wise Presentation of Hierarchical Time Series

Given the notation described above, observations are now described in Group-wise presentation. It is assumed that observations are recorded at time t=1,2, ..., n. $Y_t$ is used for the aggregate of all series at time t. Further, $Y_{i,t}$, $Y_{ij,t}$, $Y_{ijk,t}$ are the time series of components described in the aforementioned second set of notation. Thus, for hierarchy H1, the observation at each component at time t is presented by its aggregations in expression (1) as follows:

$$\begin{cases} Y_t = \sum_i^{m_+^{H_1}} Y_{i,t}^{H_1} \\ Y_{i,t}^{H_1} = \sum_j^{m_{i+}^{H_1}} Y_{ij,t}^{H_1} \\ Y_{ij,t}^{H_1} = \sum_k^{m_{ij+}^{H_1}} Y_{ijk,t}^{H_1} \end{cases} \quad (1)$$

Similarly, expressions (2) and (3) represent the hierarchies, H2 and H3, respectively:

$$\begin{cases} Y_t = \sum_i^{m_+^{H_2}} Y_{i,t}^{H_2} \\ Y_{i,t}^{H_2} = \sum_j^{m_{i+}^{H_2}} Y_{ij,t}^{H_2} \\ Y_{ij,t}^{H_2} = \sum_k^{m_{ij+}^{H_2}} Y_{ijk,t}^{H_2} \end{cases} \quad (2)$$

$$\begin{cases} Y_t = \sum_i^{m_+^{H_3}} Y_{i,t}^{H_3} \\ Y_{i,t}^{H_2} = \sum_j^{m_{i+}^{H_3}} Y_{ij,t}^{H_3} \\ Y_{ij,t}^{H_2} = \sum_k^{m_{ij+}^{H_3}} Y_{ijk,t}^{H_3} \end{cases} \quad (3)$$

Thus, observations at higher levels can be obtained by summing the series one level below with the relevant affiliation, and $m_2^{H_1} > m_1^{H_1}$. The total number of series in hierarchy H1, is $m^{H_1} = m_0^{H_1} + m_1^{H_1} + m_2^{H_1} + m_3^{H_1} = 1 + 2 + 6 + 12 = 21$, which is the total number of nodes in the hierarchy H1. Note that this notation describes the hierarchy in a parent-child perspective. Each parent component is represented by its own children.

Level-Wise Presentation of Structured Time Series

When looking at all the components in the same level, level-wise presentation is useful. This presentation allows for presenting observations at a high level by directly aggregating all the components located at different lower levels. In the example above, for the hierarchy H1, the level 0 observation, $Y_t$ can be expressed as the summation of components at level 1, or level 2, or level 3, with expression (4) as follows:

$$\begin{cases} Y_t = \sum_i^{m_1^{H_1}} Y_{1,i,t}^{H_1} \\ Y_t = \sum_j^{m_2^{H_1}} Y_{2,j,t}^{H_1} \\ Y_t = \sum_k^{m_3^{H_1}} Y_{3,k,t}^{H_1} \end{cases} \quad (4)$$

where $Y_{1,i,t}^{H_1}$, $Y_{2,j,t}^{H_1}$ and $Y_{3,k,t}^{H_1}$ are respectively the time series for the $i^{th}$ component at level 1 in hierarchy H1, the $j^{th}$ component at level 2 in hierarchy H2, the $k^{th}$ component at level 3 in hierarchy H1. This presentation is suitable for skip level summation. Similarly, expressions (5) and (6) depict hierarchies H2 and H3, respectively, thus:

$$\begin{cases} Y_t = \sum_i^{m_1^{H_2}} Y_{1,i,t}^{H_2} \\ Y_t = \sum_j^{m_2^{H_2}} Y_{2,j,t}^{H_2} \\ Y_t = \sum_k^{m_3^2} Y_{3,k,t}^{H_2}. \end{cases} \quad (5)$$

$$\begin{cases} Y_t = \sum_i^{m_1^{H_3}} Y_{1,i,t}^{H_3} \\ Y_t = \sum_j^{m_2^{H_3}} Y_{2,j,t}^{H_3} \\ Y_t = \sum_k^{m_3^{H_3}} Y_{3,k,t}^{H_3} \end{cases} \quad (6)$$

Terminology of Training and Testing Periods

Time series of length T are typically divided into two periods: a training period (from t=1, ..., t=n) and a test period (t=n+1, ..., t=T). The data in the training period is used to estimate parameters and learn prediction rules. The data in the testing period is used to evaluate the effectiveness of prediction rules. The parameter n is specified by users. For example, the parameter n may be 24 months.

Terminology of Base Forecasts and Aggregated Forecasts

Typically, for a single time series forecasting, all forecasts are made based on the historical data of the same time series. However, this may not be true in hierarchical structures. Time series in a hierarchical structure have more than one representation and consequently, there are many ways to construct forecasts for any given component. For instance, a top level forecast can be obtained either directly from forecasts based on the top level time series or by aggregating the forecasts constructed using the time series at the components at a low level. Therefore, it is beneficial to introduce the concept of base forecasts. A forecast is said to be a base forecast if the forecast at a node is made based on the time series obtained at that node. The notation $\hat{Y}$ denotes a base forecast. In contrast, any forecasts which are obtained by aggregating the base forecasts at a lower level are deemed as aggregated forecasts. The notation $\tilde{y}$ denotes an aggregated forecast.

Terminology of Forecasts with a Fixed-Training-Period but Varying Steps Ahead

A fixed-training-period with varying steps ahead, is used to compute all multiple-step-ahead base forecasts for a component in a hierarchical structure in the testing period based on the information available up to and including time n, the training period. Specifically, the base forecast for periods t=n+1, t=n+2, ..., t=n+P shall be computed, where P=T-n. We denote these base forecasts by $\{\hat{Y}_{l,j,n}^{H}(p)\}_{p=1}^{P}$, where l and j denote the $j^{th}$ node at level l in hierarchy H being forecasted.

Terminology of Forecasts with Fixed-Step-Ahead but Varying Length of Training Period This is to compute all available q-step-ahead rolling base forecasts in the test period for a component in a hierarchical structure. The parameter q is specified by users. Specifically, the base forecast at time t=(n+s)+q are computed, based on the information available up to and including time n+s, for all s=0,1, ..., S with S=T−n−q. We denote these base forecasts by $\hat{Y}_{l,j,n+s}^{H}(q)$ where l and j are the $j^{th}$ node at level l in hierarchy H being forecasted.

Forecasts with fixed-training-period emphasize the effectiveness of different steps of forecasting, whereas forecasts with fixed-step-ahead focus on the effectiveness of q-step-ahead forecast with rolling base forecasts. The overall effectiveness is a combination of these two different objectives.

Method 201 further includes a step 207 for defining base forecasts. Step 207 also includes generating top level forecasts with different base forecast levels. Without losing generality, step 207 includes assuming that (i) there are I hierarchies, and (ii) each hierarchy has L levels. Thus, at level 0, we denote $\hat{y}_{0,l,n}^{H_i}(p)$ and $\hat{y}_{0,l,n+s}^{H_i}(q)$ as the aggregated forecasts for level 0 by summing up the base forecasts at level l with a fixed-training-period and with a fixed-step-ahead, respectively. Thus, for $H_i$, expressions (7) through (10) represent aggregated forecasts with a fixed-training-period:

$$\hat{y}_{0,1,n}^{H_i}(p) = \sum_{j=1}^{m_1^{H_i}} \hat{Y}_{1,j,n}^{H_i}(p), p = 1, \ldots, P. \quad (7)$$

$$\hat{y}_{0,2,n}^{H_i}(p) = \sum_{j=1}^{m_2^{H_i}} \hat{Y}_{2,j,n}^{H_i}(p), p = 1, \ldots, P. \quad (8)$$

$$\hat{y}_{0,3,n}^{H_i}(p) = \sum_{j=1}^{m_3^{H_i}} \hat{Y}_{3,j,n}^{H_i}(p), p = 1, \ldots, P. \quad (9)$$

...

$$\hat{y}_{0,L,n}^{H_i}(p) = \sum_{j=1}^{m_L^{H_i}} \hat{Y}_{L,j,n}^{H_i}(p), p = 1, \ldots, P. \quad (10)$$

Similarly, expressions (11) through (14) represent aggregated forecasts with a fixed-step-ahead q:

$$\hat{y}_{0,1,n+s}^{H_i}(q) = \sum_{j=1}^{m_1^{H_i}} \hat{Y}_{1,j,n+s}^{H_i}(q), s = 0, 1, \ldots, S. \quad (11)$$

$$\hat{y}_{0,2,n+s}^{H_i}(q) = \sum_{j=1}^{m_2^{H_i}} \hat{Y}_{2,j,n+s}^{H_i}(q), s = 0, 1, \ldots, S. \quad (12)$$

$$\hat{y}_{0,3,n+s}^{H_i}(q) = \sum_{j=1}^{m_3^{H_i}} \hat{Y}_{3,j,n+s}^{H_i}(q), s = 0, 1, \ldots, S. \quad (13)$$

...

$$\hat{y}_{0,L,n+s}^{H_i}(q) = \sum_{j=1}^{m_L^{H_i}} \hat{Y}_{L,j,n+s}^{H_i}(q), s = 0, 1, \ldots, S. \quad (14)$$

Method 201 further includes a step 209 of calculating forecast errors. With the testing data, step 209 includes computing the forecasting error, which depends on: hierarchy H, the level x in the hierarchy that all base forecasts at that level to be aggregated, and the objective of forecast θ (varying-step-forecast or fixed-step-forecast). Specifically, we further define a forecast error function as:

$\Delta(H,x|\theta)$ $H \in \{H_0, H_1, \ldots, H_I\}$, $x \in \{0,1, \ldots, L\}$,
$\theta \in \{\theta_p, \theta_s\}$, where $\theta=\theta_p$ represents the forecasts with a fixed training period (but varying step-ahead-forecasts) and $\theta=\theta_s$ indicates the forecasts with a fixed q-step-ahead forecast (but varying length of training period). For illustrative purpose, we use MAE (Mean Absolute Error) as an example for calculating the underlying forecast error Δ. If the forecast with a fixed training period is adopted, then it results in the following measures of forecasting errors at top level 0. Each measure is associated with the aggregation of base forecasts at a particular level:

$\Delta(H_i,0,\theta_p)=\Sigma_{p=1}^{P}|Y_n(p)-\hat{Y}_n(p)|/P$, $\Delta(H_i,1,\theta_p)=\Sigma_{p=1}^{P}|Y_n(p)-\hat{y}_{0,1,n}^{H_i}(p)|/P$, $\Delta(H_i,2,\theta_p)=\Sigma_{p=1}^{P}|Y_n(p)-\hat{y}_{0,2,n}^{H_i}(p)|/P$, $\Delta(H_i,3,\theta_p)=\Sigma_{p=1}^{P}|Y_n(p)-\hat{y}_{0,3,n}^{H_i}(p)|/P$,

...

$\Delta(H_i,L,\theta_p)=\Sigma_{p=1}^{P}|Y_n(p)-\hat{y}_{0,L,n}^{H_i}(p)|/P$, in which $Y_n(p)=Y_{n+p}$ is aggregated data at level 0 at time n+p. Similarly, if a forecast with fixed-step-ahead is adopted, then it results in the following:

$\Delta(H_i,0,\theta_s)=\Sigma_{s=0}^{S}|Y_{n+s}(q)-\hat{Y}_{n+s}(q)|/(S+1)$ $\Delta(H_i,1,\theta_s)=\Sigma_{s=0}^{S}|Y_{n+s}(q)-\hat{y}_{0,1,n+s}(q)|/(S+1)$ $\Delta(H_i,2,\theta_s)=\Sigma_{s=0}^{S}|Y_{n+s}(q)-\hat{y}_{0,2,n+s}(q)|/(S+1)$ $\Delta(H_i,3,\theta_s)=\Sigma_{s=0}^{S}|Y_{n+s}(q)-\hat{y}_{0,3,n+s}(q)|/(S+1)$

...

$\Delta(H_i,L,\theta_s)=\Sigma_{s=0}^{S}|Y_{n+s}(q)-\hat{y}_{0,L,n+s}(q)|/(S+1)$ It should be appreciated that measures in calculating the underlying forecast errors Δ are not only limited to MAE at the top level. Any other appropriate forecast error measures such as Mean Absolute Percentage Error (MAPE), Median Absolute Percentage Error (MdAPE), Mean Square Errors (MSE), Median Square Errors, etc. can be used. The effectiveness of forecast at other levels can also be computed in a similar fashion and their optimality can be determined analogously.

Method 201 further includes conducting an optimization routine 211. Optimization routine 211 includes determining whether $R^E > \delta$ ($R^E$ is described below, and $\delta$ is a user specified parameter described below). Finding an optimal forecasting hierarchy and its associated level of aggregation can be accomplished by solving the following optimization program:

$$\operatorname*{argmin}_{x \in \{0,1,\ldots,L\}} H \in \{H_0, H_1, \ldots, H_I\}, \Delta(H, x),$$

where $\Delta(H,x)$ is a combination of measures of the forecast errors $\Delta(H,x|\theta_p)$ and $\Delta(H,x|\theta_s)$ for each given level x in hierarchy H. Examples of such combinations are:
$\Delta(H,x) = w\Delta(H,x|\theta_p) + (1-w)\Delta(H,x|\theta_s)$ for a given weight $w \in [0,1]$; in particular, when $w=0$, it emphasizes on the fixed-step rolling forecasts, whereas when $w=1$, the focus is given to the forecast errors of multiple-step predictions with a fixed learning period.
$\Delta(H,x) = \min\{\Delta(H,x|\theta_p), \Delta(H,x|\theta_s)\}$. The function emphasizes on the best prediction of the two objectives.
$\Delta(H,x) = \max\{\Delta(H,x|\theta_p), \Delta(H,x|\theta_s)\}$. It focuses on the worst prediction of two objective functions.

For example, if $(H^*,x^*)$ is the best solution of the optimization program, then $H^*$ is optimal hierarchy, and $x^*$ is the optimal base forecast level in $H^*$. Allow:

$$R^E(H, x) = \frac{\Delta(H, x)}{\Delta(H^*, x^*)} - 1$$

to represent the deficiency ratio if the level x in hierarchy H is used to aggregate the forecast instead of the optimal choice $(H^*,x^*)$. Let:

$$\Omega = \{(H,x) : R^E(H,x) \leq \delta\}$$

be a set of the solutions with deficiency ratio no larger than $\delta$, where $\delta \geq 0$ is a given small number. $\delta$ is a significance level and can be either empirically estimated or predetermined. A step 213 includes determining if $\Omega$ has only one member. The optimality of forecasting hierarchy is conclusive when $\Omega$ has only one member $(H^*,x^*)$, as depicted in step 217. In this case, we aggregate all the base forecasts at level $x^*$ in hierarchy $H^*$ to predict at level 0 and these forecasts (at level zero) have the smallest forecast error. The optimality of forecast is inconclusive if $\Omega$ has multiple members, as depicted in step 215. In that case, we can take the average of the forecasts given by each member in the set $\Omega$. Note that if $\delta$ is set to zero, then the optimal forecasting hierarchy is always conclusive.

Method 201 is an analytical approach to determining an optimal forecasting hierarchy and its associated optimal level of aggregation for hierarchical data systems. With this approach, significant advantages include: (1) the ability to quantitatively evaluate many hierarchies in multi-dimensionally hierarchical systems, (2) the ability to select an optimal forecast hierarchy, and (3) the ability to optimally determine reconcile forecast method, given that an optimal forecast hierarchy has been determined.

Method 201 (shown in FIG. 2) is described with reference to the system 101 (shown in FIG. 1) for the sake of convenience. The method 201 can be performed by alternative systems and can be performed using a variety of data. In this example, the forecasting engine 105 retrieves input data from the database 107; however, in alternative embodiments the forecasting engine 105 can retrieve data from the database 107 and/or one or more users, data sources, and/or other systems. In some embodiments, method 201, shown in FIG. 2, can be implemented as software for determining one or more optimal forecasting hierarchy, for example where the software is embodied in computer-readable media and executable by one or more computer processors to perform method 201.

The present disclosure provides a forecasting system and method, where examples have been described, in part, that involve mortgage data. However, the concepts described herein can also be applied to other applications. Any forecasts that involve a panel of time series with group structure are applicable. Examples include forecasts of sales (e.g. drug sales), consumption demands (e.g. utility or energy demands), and marketing (e.g. effectiveness evaluations, strategy constructions).

It is apparent that a system with significant advantages has been described and illustrated. Although the present system is shown in a limited number of forms, it is not limited to just these forms, but is amenable to various changes and modifications without departing from the spirit thereof.

What is claimed is:

1. A computer-implemented method for determining an optimal forecasting hierarchy, the method being performed using a processing unit, the method comprising:
setting, by the processing unit, a plurality of parameters for which the optimal forecasting hierarchy is being determined;
setting, by the processing unit, a plurality of hierarchies by setting each hierarchy in terms of a hierarchy structure, each hierarchy structure having a plurality of components at a plurality of levels, each component being identified in correlation with its location in the hierarchy structure;
defining base forecast levels at each level for each hierarchy, each base level forecast being made based on a time series at each level;
generating top level forecasts for a testing period, each top level forecast being based upon an aggregation of the base forecast levels;
calculating a forecast error by analyzing data associated with the testing period, the top level forecasts and forecast error being processed by the processing unit;
conducting an optimization routine with the processing unit, the optimization routine comprising:
determining an optimal hierarchy $H^*$ and determining an optimal base level $x^*$ within the optimal hierarchy $H^*$, both the optimal hierarchy $H^*$ and optimal base level $x^*$ being based upon a smallest associated forecast error;
calculating a deficiency ratio for each level within each hierarchy by comparing data associated with the optimal base level $x^*$ and the optimal hierarchy $H^*$ to data associated with each of the other base levels and hierarchies; and
comparing the deficiency ratio to a significance level in order to determine the optimal forecasting hierarchy.

2. The method of claim 1, wherein the step of setting the plurality of hierarchies includes identifying each component as a single component within the hierarchy structure.

3. The method of claim 1, wherein the step of setting the plurality of hierarchies includes identifying each component as a part of a group within the hierarchy structure, each grouping having the same identity.

4. The method of claim 1, wherein the step of setting the plurality of hierarchies includes identifying each component using matrix subscript notations such that matrix subscript notations associated with each component identify the location of each component within the hierarchy structure.

5. The method of claim 1, wherein the testing period is a varying step-ahead time period.

6. The method of claim 1, wherein the testing period is a fixed step-ahead time period.

7. The method of claim 1, wherein an effectiveness of forecasts is based on a combination of prediction errors associated with a varying step-ahead forecast and a fixed step-ahead forecast.

8. The method of claim 1, wherein the step of setting the significance level includes setting the significance level to equal zero.

9. The method of claim 1, wherein the step of comparing the deficiency ratio to the significance level in order to determine the optimal forecasting hierarchy results in the determining of multiple optimal forecasting hierarchies.

10. A system for determining an optimal forecasting hierarchy, the system comprising:
   non-volatile memory storing computer-readable media instructions;
   a processing unit performing the following instructions:
      setting a plurality of parameters for which the optimal forecasting hierarchy is being determined;
      setting a plurality of hierarchies by setting each hierarchy in terms of a hierarchy structure, each hierarchy structure having a plurality of components at a plurality of levels, each component being identified in correlation with its location in the hierarchy structure;
      defining base forecast levels at each level for each hierarchy, each base level forecast being made based on a time series at each level;
      generating top level forecasts for a testing period, each top level forecast being based upon an aggregation of the base forecast levels;
      calculating a forecast error by analyzing data associated with the testing period;
      conducting an optimization routine with the processing unit, the optimization routine comprising:
         determining an optimal hierarchy H* and determining an optimal base level x* within the optimal hierarchy H*, both the optimal hierarchy H* and optimal base level x* being based upon a smallest associated forecast error;
         calculating a deficiency ratio for each level within each hierarchy by comparing forecast errors associated with the optimal base level x* and the optimal hierarchy H* to forecast errors associated with each of the other base levels and hierarchies; and
         comparing the deficiency ratio to a significance level in order to determine the optimal forecasting hierarchy.

11. The system of claim 10, wherein the step of setting the plurality of hierarchies includes identifying each component as a single component within the hierarchy structure.

12. The system of claim 10, wherein the step of setting the plurality of hierarchies includes identifying each component as a part of a group within the hierarchy structure, each grouping having the same identity.

13. The system of claim 10, wherein the step of setting the plurality of hierarchies includes identifying each component using matrix subscript notations such that matrix subscript notations associated with each component identify the location of each component within the hierarchy structure.

14. The system of claim 10, wherein the testing period is a varying step-ahead time period.

15. The system of claim 10, wherein the testing period is a fixed step-ahead time period.

16. The system of claim 10, wherein an effectiveness of forecasts is based on a combination of prediction errors associated with a varying step-ahead forecast and a fixed step-ahead forecast.

17. The system of claim 10, wherein the step of setting the significance level includes setting the significance level to equal zero.

18. The system of claim 10, wherein the step of comparing the deficiency ratio to the significance level in order to determine the optimal forecasting hierarchy results in the determining of multiple optimal forecasting hierarchies.

19. A non-transitory computer-readable media storing software for determining an optimal forecasting hierarchy, when executed, performing the steps of:
   set a plurality of parameters for which the optimal forecasting hierarchy is being determined;
   set a plurality of hierarchies by setting each hierarchy in terms of a hierarchy structure, each hierarchy structure having a plurality of components at a plurality of levels, each component being identified in correlation with its location in the hierarchy structure;
   define base forecast levels at each level for each hierarchy, each base level forecast being made based on a time series at each level;
   generate top level forecasts for a testing period, each top level forecast being based upon an aggregation of the base forecast levels;
   calculate a forecast error by analyzing data associated with the testing period;
   conduct an optimization routine, the optimization routine comprising:
      determining an optimal hierarchy H* and determining an optimal base level x* within the optimal hierarchy H*, both the optimal hierarchy H* and optimal base level x* being based upon a smallest associated forecast error;
      calculating a deficiency ratio for each level within each hierarchy by comparing forecast errors associated with the optimal base level x* and the optimal hierarchy H* to forecast errors associated with each of the other base levels and hierarchies; and
      comparing the deficiency ratio to a significance level in order to determine the optimal forecasting hierarchy.

20. The software of claim 19, wherein the operation set the plurality of hierarchies includes identifying each component as a single component within the hierarchy structure.

21. The software of claim 19, wherein the operation to set the plurality of hierarchies includes identifying each component as a part of a group within the hierarchy structure, each grouping having the same identity.

22. The software of claim 19, wherein the operation to set the plurality of hierarchies includes identifying each component using matrix subscript notations such that matrix subscript notations associated with each component identify the location of each component within the hierarchy structure.

23. The software of claim 19, wherein the testing period is a varying step-ahead time period.

24. The software of claim 19, wherein the testing period is a fixed step-ahead time period.

25. The software of claim 19, wherein an effectiveness of forecasts is based on a combination of prediction errors associated with a varying step-ahead forecast and a fixed step-ahead forecast.

26. The software of claim 19, wherein the step of setting the significance level includes setting the significance level to equal zero.

27. The software of claim 19, wherein the step of comparing the deficiency ratio to the significance level in order to determine the optimal forecasting hierarchy results in the determining of multiple optimal forecasting hierarchies.

* * * * *